United States Patent [19]

Ichinose et al.

[11] 3,936,768
[45] Feb. 3, 1976

[54] MOLECULAR GAS LASER DEVICE WITH AN IMPROVED OUTPUT MIRROR MEANS

[75] Inventors: Akira Ichinose; Norio Karube, both of Kadoma, Japan

[73] Assignee: Matsushita Electric Industrial Co., Ltd., Japan

[22] Filed: July 5, 1973

[21] Appl. No.: 376,825

[30] Foreign Application Priority Data
July 5, 1972    Japan................................ 47-67729

[52] U.S. Cl....................... 331/94.5 C; 331/94.5 G
[51] Int. Cl.² ........................................... H01S 3/08
[58] Field of Search..................................... 331/94.5

[56] References Cited
UNITED STATES PATENTS
3,404,349   10/1968   Rigrod .............................. 331/94.5

*Primary Examiner*—William L. Sikes
*Attorney, Agent, or Firm*—Robert E. Burns; Emmanuel J. Lobato; Bruce L. Adams

[57] ABSTRACT

A high power multibeam laser having an improved output coupling mirror comprised of either a single mirror or a plurality of mirror elements attached to a mirror-supporting member. The inner face of the output coupling mirror, whether it be composed of a single mirror or a plurality of mirror elements, lies in a single flat plane which is perpendicular to the optical axis of the laser device. The outer face of the optical mirror may also be planar or may have a convex curvature with respect to the laser device.

4 Claims, 5 Drawing Figures

MOLECULAR GAS LASER DEVICE WITH AN IMPROVED OUTPUT MIRROR MEANS

The present invention relates to a high output laser device with an efficient output mirror.

In one embodiment according to the present invention, the output mirrors from which the laser beam output power is taken out are abraded or polished respectively at the same time, as though the mirrors would consist of a common output mirror and they are used as single common mirror. This results in obtaining high output power by allowing the output beam from each laser tube to parallel each other in cooperation with a focus device, such as rotating parabola means.

In the prior art, the following two techniques are mainly employed in order to obtain high output power from a molecular gas laser. One is a method in which the laser tubes are lengthened. However, in this method since the tubes must be used within the length of from a few meters to several tens of meters, it is sometimes difficult to use them for practical applications. The other method is to cool a gas contained within the laser tubes, wherein rise of temperature of gas flowing at high speed can be prevented and a high output power can be obtained. In this system because of high speed gas flow, a blower and a radiator are required, thus the entire device tends to become considerably large. In addition, the diameter of the output mirror, in many cases, often becomes an order of $50\phi$, so that the spot size of the laser beam tends to increase due to multi-oscillation modes, thus making concentration of the beam difficult. Furthermore, mere rise of input as a result of expansion of the laser tube diameter will lead the temperature at the center portion of the tube to rise, for instance, about 100°C, and the oscillation will cease. The juxtaposition of a plurality of laser tubes merely causes the misalignment in the direction of the laser beam, so that it is difficult to obtain an accurate parallel laser beam. This, in turn, makes concentration of the beam on a minute area as a spot difficult. For those reason described above, the manufacture of the laser device is sometimes difficult and the number of parts to be used increases, and the costs thereof tend to be higher in the prior art, as well as the weight of the device increases, involving difficulty when carrying.

It is, therefore, an object of the present invention to solve the problems encountered in the prior art.

It is another object of the present invention to provide an efficient laser device, wherein a vertical oscillation of the laser beam to the output mirrors is employed when plane mirrors are used as the output mirrors.

It is another object of the present invention to provide a laser device, wherein a vertical oscillation of the laser beam to the output mirror means is employed and each output mirror, in connection with a plurality of the laser tubes, is abraded commonly so as to obtain a high laser beam output capable of concentrating the beam on a minute area.

It is another object of the present invention to provide a laser device wherein a vertical oscillation of the laser beam to the output mirror means is employed and a single common mirror is used so as to obtain a high laser beam output capable of concentrating the beam on a minute area.

It is another object of the present invention to provide a laser device which is easy to manufacture and is less expensive.

These and other objects and features and advantages will become apparent from the following description in conjunction with the accompanying drawings in which.

Figure 1:
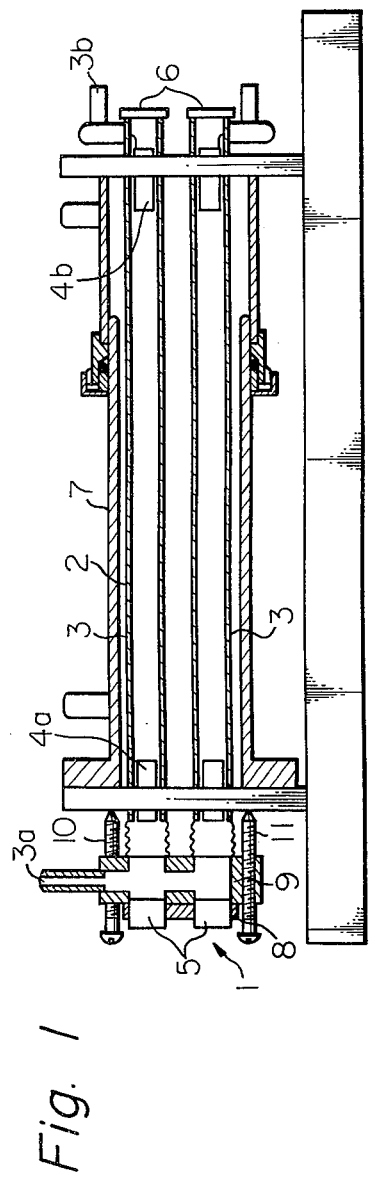
FIG. 1 shows one embodiment of a laser device according to the present invention in which a crosssectional view of the device is illustrated.

Referring to FIG. 1, a gas laser device according to the present invention is illustrated. An explanation is made to a $CO_2$ gas laser device in this embodiment, but it is apparent that other gases are also applicable. The device comprises four gas laser tubes in mutual alignment. Each laser tube 2 includes a gas tube 3 (discharge tube) with gas inlet 3a and outlet 3b and cylindrical electrodes 4a and 4b provided at end portions of the tubes 3. The laser device also comprises output mirrors 5 mounted at each end of the tubes 3 and full reflective mirrors 6 attached at the other ends of the tubes 3. The gas tubes 3 are made of insulating materials, such as glass, or ceramics and they are retained in such manner that maximum accurate juxtaposition can be obtained within the accuracy of manufacturing technique. The electrodes are made of stainless steel or carbon. The full reflective mirrors 6 are made of glass or metals, such as carbon tool steel, or a material evaporated, by a substance such as gold or aluminum with a large reflectivity of 10.6 microns in thickness, on a semiconductor substrate. Each full reflective mirror 6 is bonded to the gas tubes 3 in such a manner that it is perpendicular to the direction of the length thereof by adjustment.

The output mirrors 5 are made by adhering a mirror material, such as Ge, GaAs, which passes the infrared ray in the vicinity of 10.6 microns with a mirror supporting plate 8 in the position corresponding to each gas tube through adhesive and then by commonly plane-abrading the front and back of each mirror so as to align the front and back of each output mirror on the same plane. After abrasion, an appropriate reflectivity of about from a few percent to several ten percent is given to the mirrors by a multi-layer film evaporation method.

The cooling means 7 constitutes a water coller covering each gas tube 3 and it is, in this case, common to all the gas tubes 3 so as to minimize the size of the laser device 1. However, it may be constructed so as to cool each tube as the conventional laser devices.

The mirror supporting plate 8 is made of a suitable air-tight material, such as metals, glass, or ceramics, which retains each output mirror in common alignment. The mirror fortifying means 9 is made of a metal, such as carbon tool steel, cobar, stainless steel, or ceramic glass. With this construction the mirror supporting member 8 is prevented from being distorted by a force produced from the difference between an external pressure and an internal pressure, which will otherwise lead to loss of mutual parallelism on each output mirror and, in turn, lead to loss of parallelism of the output beam.

According to the present invention the output mirror is adjustable by means of bellows 10 and screw 11. The output mirror 5 is adjusted by the screw 11 in such a manner that the laser beam output reaches maximum after discharge. The gas inlet 3a is mounted on the mirror fortifying member 9, which is assembled in one body with the electrodes 4a through the bellows 10 so that voltage can be applied to the electrode 4a.

In the embodiment shown in FIG. 1, the device is not restricted by size of the infrared passing material available, so that the beam output power can be easily increased by merely increasing the number of the laser tubes. For instance, assuming now that the laser device has the tube length of 2m and the tube diameter of 160$\phi$ with the external diameter of 25$\phi$, gas tubes numbering up to nineteen can be used in an aligned juxtaposition around the tube axis, thereby obtaining an output power of 1.9 KW. Further, when the tubes take one meter length, then the output power of about 760 W is obtainable.

Figure 2:
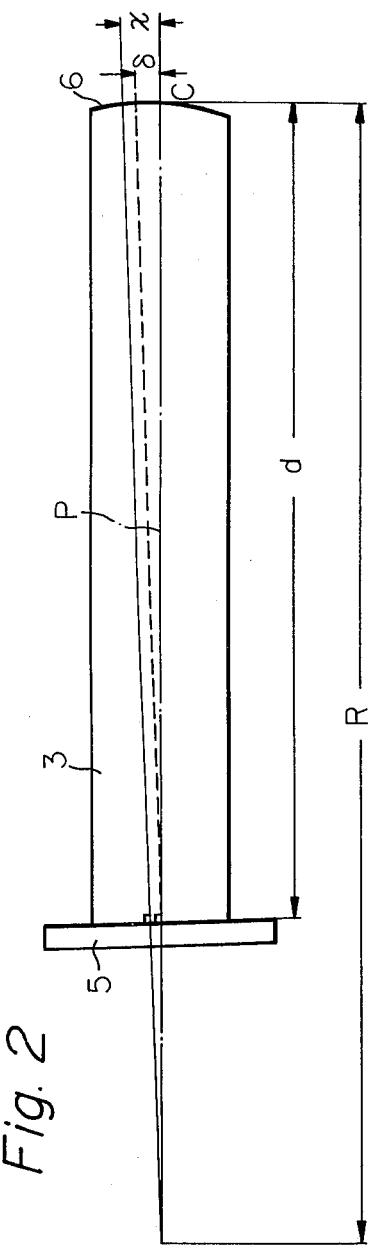
FIG. 2 shows a deviated laser beam oscillation due to a deviation of the gas tube.

Referring now to FIG. 2, a deviation of the laser oscillation due to deviation of the tubes is illustrated. In the figure, it is to be noted that even if the gas tube is deviated from the parallelism or alignment, the output power from each of the laser tubes 2 is kept constant and each beam remains parallel mutually. In this case, assuming now that the maximum deviation of each discharge tube 3 from the reference parallel line, or optical axis P is $\delta$ mm and a concave mirror with radius of R (the center of which is indicated as C) is used as a full reflective mirror 6, where the distance between the full reflective mirror 6 and the output mirror 5 is $d$, the laser oscillation takes place, as well-known, centering on the position deviated by $X = R \delta/d$ from the centering position C of the full reflective mirror 6 and perpendicular to the output mirror 5, regardless of the direction of the charge tubes. Accordingly, the laser beam from each laser tube 2 runs parallel each other since the output mirror 5 is commonly plane-abraded. The value of this deviation X becomes X = 0.2 mm when, for instance, $\delta = 0.1$ mm, R = 2 m, and $d = 1$ m are taken so that it does not actually give any effect to the laser output. Accordingly, a high output laser beam can be obtained and the divergency of the beam is almost the same as that when each of the laser tubes 2 is independently oscillated.

Figure 3:
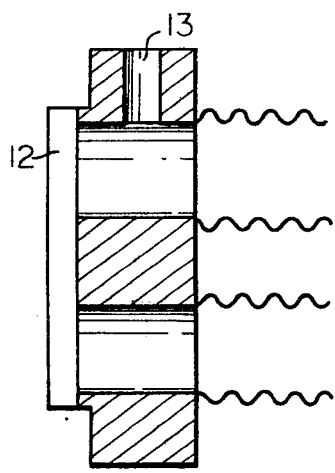
FIG. 3 shows a cross-sectional view of another embodiment of the output mirror according to the present invention.

In FIG. 3, another embodiment of the output mirror according to the present invention is shown, wherein the output mirror 12 is made of a single abraded mirror which is attached to the mirror fortifying member 13. As shown in the figure, the single output mirror 12 is mounted to the member 13 which has cavities coupled to the bellows.

Figure 4:
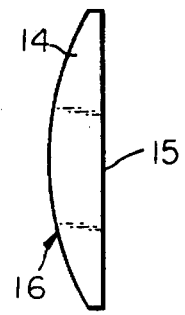
FIG. 4 shows still another embodiment of the output mirror with a flat surface at one side and a spherical surface at the other side.

In FIG. 4, there is shown still another embodiment of the output mirror according to the present invention, wherein one side of the mirror which faces the gas tube is made plane as designated 15 while the other side thereof is made spherical 16 so as to concentrate the laser beam at the focussing point.

Figure 5:
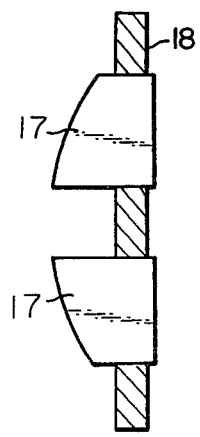
FIG. 5 shows another embodiment according to the present invention in which the output mirror is divided into a plurality of portions and retained by a supporting member.

In FIG. 5, there is shown a further modified embodiment of the output mirror according to the present invention, wherein the output mirror 14 is divided into a plurality of mirror portions, in this case, the two portions 17, and the portions of the mirror are retained by the mirror supporting plate 18, respectively. The manner in which the output mirror is arranged is almost the same as that corresponding to the device shown in FIG. 1. In this case, the output mirror may be adjusted so as to become perpendicular to one of the laser tubes and may be fixed to the discharge tube, as it is, by using adhesive. In this case, once the mirror has been adjusted, little deviation arises afterwards so that handling of the device will be remarkably facilitated.

As described hereinabove, according to the present invention a laser device capable of producing a powerful laser beam with minimized spot size is obtainable with a compact construction.

Furthermore, since the spot size of the beam is made minimized, a laser beam energy can be concentrated on a very small area, thus producing a striking effect for practical use.

Moreover, to make a plane surface of the output mirror at the oscillation side and a spherical surface at the other side enables the output mirror to function itself as a supplemental optical system, so that is allows the laser beam to be concentrated at the focus point thereof. With this construction, a high output power is available from any conventional laser devices. When the strong concentration laser beam is desired, any types of the laser devices such as glass laser, gas laser, color component laser or the like will be effective.

It will, of course, be recognized that various modifications and equivalents will readily occur to those skilled in the art and it is therefore intended that such be covered by the appended claims.

What is claimed is:

1. A high power multibeam laser system comprising: a plurality of oscillator tubes containing therein a laser medium and positioned approximately parallel to one another, at least one totally reflecting mirror disposed at one end of said oscillator tubes, an output coupling mirror disposed at the other end of said oscillator tubes, and means for applying pump energy to said laser medium for establishing a population inversion therein, and wherein said output coupling mirror comprises plural segmented mirror elements having at least the inner faces which face said oscillator tubes lying in a single flat plane.

2. A high power multibeam laser system according to claim 1, including a mirror-supporting plate, and wherein said segmented mirror elements are retained by said mirror-supporting plate.

3. A high power multibeam laser system according to claim 1, in which the outer faces of said segmented mirror elements lie in a flat plane.

4. A high power multibeam laser system according to claim 1, in which the outer faces of said segmented mirror elements collectively form a partly sherical configuration.

* * * * *